_United States Patent Office_

3,239,569
Patented Mar. 8, 1966

3,239,569
HYDROFORMYLATION OF OLEFINS
Lynn H. Slaugh, Pleasant Hill, and Richard D. Mullineaux, Oakland, Calif., assignors to Shell Oil Company, New York, N.Y., a corporation of Delaware
No Drawing. Filed May 13, 1963, Ser. No. 280,132
14 Claims. (Cl. 260—632)

This application is a continuation-in-part of copending application, Serial No. 46,071, filed July 29, 1960 and now abandoned.

This invention relates to the production of aldehydes and/or alcohols from olefinically unsaturated compounds. The invention relates more particularly to the production of aldehydes and/or alcohols by the addition of carbon monoxide and hydrogen to olefinic hydrocarbons in the presence of an improved catalyst.

Processes directed to the production of reaction mixtures comprising substantial amounts of aldehydes and at times lesser amounts of alcohols by the reaction of olefinic compounds with carbon monoxide and hydrogen at elevated temperatures and pressures in the presence of certain catalysts are well known in the art. The aldehydes and alcohols produced generally correspond to the compounds obtained by the addition of a carbonyl or carbinol group to an olefinically unsaturated carbon atom in the starting material with simultaneous saturation of the olefin bond. Isomerization of the olefin bond may take place to varying degrees under certain conditions with the consequent variation in the products obtained. These processes known in the industry, and referred to herein as hydroformylation, involve reactions which may be shown in the general case by the following equation:

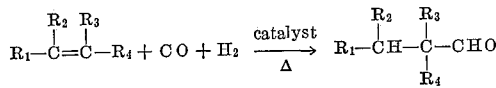

and/or

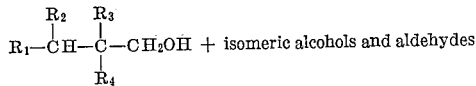

In the above equation, each R represents an organic radical, for example hydrocarbyl, or a suitable atom such as hydrogen or a halogen. The above reaction is similarly applied to an olefinic linkage in a cycloaliphatic ring.

In the past, dicobalt octacarbonyl as such or in several different forms generally has been used as the catalyst for the hydroformylation of olefins. This catalyst, which can be prepared from many forms of colbalt, usually decomposes rapidly unless high pressures (1000–4500 p.s.i.g.) of carbon monoxide are maintained. Correspondingly high pressures of hydrogen are also necessary. A most serious disadvantage of prior hydroformylation processes, however, has been the necessity of proceeding in two steps when alcohols are the desired product. Thus in processes disclosed heretofore, it is generally necessary first to react the olefin to be hydroformylated with carbon monoxide and hydrogen to form the corresponding aldehyde. It is then neecssary to carry out a second reaction with hydrogen to reduce the aldehyde to the alcohol in a separate operation. A different catalyst for the hydrogenation is usually needed for this second step since the hydroformylation catalysts heretofore employed are not sufficiently effective for this purpose. This results in the need for relatively expensive high-pressure equipment and for a large amount of such equipment to handle the two steps.

A further disadvantage inherent in processes directed to hydroformylation disclosed heretofore is a relative inability to direct the reactions involved to the production of predominantly terminal alcohols when the olefin contains more than two carbon atoms, particularly when the charge to the process comprises primarily internal olefins.

It is therefore an object of the present invention to provide an improved hydroformylation process enabling the more efficient production of aldehydes and/or alcohols by the catalytic reaction of olefinic compounds with carbon monoxide and hydrogen.

Another object of the present invention is the provision of an improved hydroformylation process enabling the more efficient production of aldehydes and/or alcohols by reaction of olefinic compounds with carbon monoxide and hydrogen in the presence of an improved hydrofromylation catalyst.

Still another object of the present invention is the provision of an improved hydroformylation process enabling the more efficient single stage production of alcohols by the reaction of olefinic hydrocarbons with carbon monoxide and hydrogen in the presence of an improved catalyst enabling the use of substantially lower pressures than generally possible heretofore.

Still another object of the present invention is the provision of an improved process enabling the more efficient, direct single stage hydroformylation of internal olefins to reaction products predominating in terminal alcohols. Other objects and advantages of the present invention will become apparent from the following detailed description thereof.

In accordance with the present invention, olefinic compounds are converted to saturated aldehydes and/or alcohols having one or more carbon atoms than the olefinic compounds by reacting the olefinic compounds in liquid phase, with carbon monoxide and hydrogen, at a temperature of from about 100° to about 300° C. in the presence of a cobalt catalyst comprising cobalt in complex combination with carbon monoxide and a phosphorus-containing ligand consisting essentially of a tertiary organo phosphorus compound in which the phosphorus is trivalent (referred to herein as phosphines).

In its active form, the suitable complex cobalt catalysts will contain the cobalt component in a reduced valence state. This will normally be a zero valence state and may suitably be even lower, such as a −1 valence state.

As used throughout this specification and claims, the term "complex" means a coordination compound formed by the union of one or more electronically rich molecules or atoms capable of independent existence with one or more electronically poor molecules or atoms, each of which is also capable of independent existence.

In the suitable ligands containing trivalent phosphorus comprised in the complex catalyst employed in the process of the invention, the phosphorus atom has one available or unshared pair of electrons. Any essentially organic derivative of trivalent phosphorus with the foregoing electronic configuration is a suitable ligand for the cobalt-containing catalysts of the present invention. When trivalent phosphorus has such an electronic configuration, it is capable of forming a coordinate bond with cobalt in its 0 and −1 valent state. It thus will operate as a ligand in forming the desired cobalt complexes such as catalysts in the present process.

Organic radicals of any size and composition may be bonded to the phosphorus atom. Contemplated within the scope of this invention, therefore, are trivalent phosphorus compounds having aliphatic, and/or cycloaliphatic, and/or heterocyclic, radicals satisfying its three valences. These radicals may contain a functional group such as the carbonyl, carboxyl, nitro, amino, hydroxy functional groups, saturated or unsaturated carbon-tocarbon linkages, as well as saturated and unsaturated non-carbon-to-carbon linkages.

It is also suitable for an organic radical to satisfy more than one of the valences of the phosphorus atom, thereby forming a heterocyclic compound with a trivalent phosphorus atom. For example, an alkylene radical may satisfy two phosphorus valences with its two open valences and thereby form a cyclic compound. Another example would be the alkylene dioxy radical to form a cyclic compound where oxygen atoms link an alkylene radical to the phosphorus atom. In these two examples, the third phosphorus valence may be satisfied by any other organic radical.

Another type of structure involving trivalent phosphorus having an available pair of electrons are those containing a plurality of such phosphorus atoms linked by organic radicals. This type of a compound is called a bidentate ligand when two such phosphorus atoms are present, a tridentate ligand when three such phosphorus atoms are present, and so forth. Examples of these polydentate ligands include such structures as:

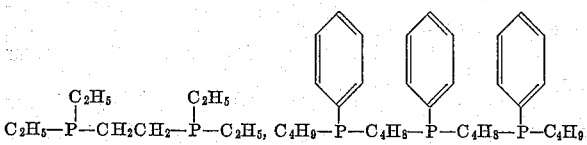

and the like.

Suitable catalysts within the scope of those employed in the process of the invention include the tertiary organophosphine-cobaltcarbonyl complexes represented by the empirical formula:

$$(R_3P)_pCo(CO)_n \qquad (I)$$

wherein R is an organic radical and $p$ and $n$ are integers, each having a value of at least 1 and whose sum is 4. Each R in the foregoing formula may represent, for example, a hydrocarbyl group, such as alkyl (including cycloalkyl; a hydrocarbyloxy group such as alkoxy, and the like. The phosphorus-containing ligand ($R_3P$) component of the complex catalyst may thus suitably be tertiary phosphine, such as a trialkyl phosphine, a trialkoxyphosphine, and the like. The hydrocarbyl and hydrocarbyloxy components, R, need not necessarily be the same and suitable tertiary organophosphine ligands comprise the mixed phosphines wherein two or more of the three substituent R's are different members of the groups comprising alkyls aryls, aralkyls, alkaryls, alkoxy, aralkoxy, and the like. As indicated above, the substituent R's may contain oxygen, halogen (preferably middle halogen) or sulfur atoms. Preferred catalysts of the above-defined class comprise those wherein each R contains from 1 to 20 carbon atoms, and the total number of carbons in the tertiary organophosphine ($R_3P$) group does not exceed about 30. A particularly preferred group of catalysts within the above-defined class are the trialkylphosphine-cobaltcarbonyl complexes wherein the phosphorus-containing component of the catalyst is a trialkylphosphine in which each alkyl is a lower alkyl having from 1 to 10 carbons of straight or branched chain structure.

It is to be understood that the suitable catalysts identified by the foregoing empirical Formula I may comprise two or more of the $[(R_3P)_pCo(CO)_n]$ groups. For example, in the suitable catalysts, the complex between cobalt, carbon monoxide, and phosphorus-containing ligand identified by the foregoing empirical Formula I may be monomeric in structure or may be composed of several monomeric units. Thus, the complex formed between cobalt, carbon monoxide and trialkyl phosphine, such as triethylphosphine-cobaltcarbonyl, tri-n-butylphosphine-cobalt-carbonyl, etc., may be present as a dimer.

Specific examples of suitable catalysts of the above-defined class comprise complexes between cobalt, carbon monoxide, and one of the following tertiary organophosphines:

Trimethylphosphine
Triethylphosphine
Tri-n-butylphosphine
Triamylphosphines
Trihexylphosphines
Tripropylphosphine
Trinonylphosphines
Tridecylphosphines
Di-n-butyl octadecylphosphine
Dimethyl-ethylphosphine
Diamylethylphosphine
Ethyl-bis($\beta$-phenylethyl)phosphine
Tricyclopentylphosphine
Tricyclohexylphosphine
Dimethyl-cyclopentylphosphine
Tri-octylphosphine
Diphenyl-methylphosphine
Diphenyl-butylphosphine
Diphenyl-benzylphosphine
Trilaurylphosphine
Triethoxyphosphine
n-Butyl-diethoxyphosphine Of these catalysts, the triacyclic aliphatic phosphines and trialicyclic aliphatic (cycloalkyl) phosphines are somewhat preferred. A particularly preferred catalyst comprises cobalt-carbonyl-tri-n-butyl phosphine $$[Co(CO)_3P(Bu)_3]_2$$

The cobalt-containing complexes used as catalysts in the process of this invention may be prepared by a diversity of methods. A convenient method is to combine an organic or inorganic salt of cobalt with the desired phosphorus-containing ligand, for example, a triorganophosphine such as a trialkylphosphine in liquid phase. Suitable cobalt salts comprise, for example, cobalt carboxylates such as acetates, octoates, etc., as well as cobalt salts of mineral acids such as chlorides, sulfates, sulfonates, etc. The valence state of the cobalt may then be reduced and the cobalt-containing complex formed by heating the solution in an atmosphere of hydrogen and carbon monoxide. The reduction may be performed prior to the use of the catalysts or it may be accomplished simultaneously with the hydroformylation process of this invention. Alternatively, the catalysts may be prepared from a carbon monoxide complex of cobalt. For example, it is possible to start with dicobalt octacarbonyl and by heating this substance with a suitable phosphorus-containing ligand of the type previously described, for example, trialkylphosphine, the ligand will replace one or more of the carbon monoxide molecules, producing the desired catalyst. This latter method was utilized in the preparation of most of the catalysts used in the examples hereinafter described. This method is very convenient for regulating the number of carbon monoxide molecules and phosphorus-containing ligand molecules present in the catalyst. Thus, by increasing the amount of phosphorus-containing ligand added to the dicobalt octacarbonyl, more of the carbon monoxide molecules are replaced.

In accordance with the invention, olefinic compounds are hydroformylated to reaction products predominating in aldehydes and/or alcohols by intimately contacting the olefinic compound in liquid phase with carbon monoxide and hydrogen in the presence of the above-defined catalysts comprising a complex of cobalt with a phosphorus-containing ligand and carbon monoxide at well-defined conditions of temperature and pressure.

A particular advantage inherent in the process of the invention resides in the ability of the catalyst to remain stable and exhibit high-activity for long periods of time at very low pressures. Consequently, hydroformylation in accordance with the present invention may be carried out at pressures well below 1000 p.s.i.g. to as low as 1 atmosphere or less. Under comparable conditions, catalysts of the prior art such as dicobalt octacarbonyl, often decompose and become inactive. The invention is, however, not limited in its applicability to the lower pressures and pressures in the broad range from atmospheric up to about 2000 p.s.i.g. and higher may be employed. The specific pressure preferably used will be governed to some extent by the specific charge and catalyst employed. In general, pressures in the range of from about 300 to about 1500 p.s.i.g. and particularly in the range of from about 400 to about 800 p.s.i.g. are preferred. The unique stability of the catalysts of the present invention at the lower pressures makes the use of pressures below about 1500 p.s.i.g. particularly desirable.

Temperatures employed will generally range from about 100° to about 300° C. and preferably from about 150° to about 210° C., a temperature of about 200° C. being generally satisfactory. Somewhat higher or lower temperatures may, however, be used within the scope of the invention.

The ratio of catalyst to the olefin to be hydroformylated is generally not critical and may vary widely within the scope of the invention. The ratio of catalyst to olefin charge may be varied to achieve a substantially homogeneous reaction mixture. Solvents are therefore not required. However, the use of solvents which are inert, or which do not interfere to any substantial degree with the desired hydroformylation reaction under the conditions employed, may be used within the scope of the invention. Saturated liquid hydrocarbons, for example, may be used as solvent in the process, as well as ketones, ethers, and the like. Ratios of catalyst to olefin between about 1:1000 and about 10:1 are found to be satisfactory; higher or lower catalyst to olefin ratios may, however, be used within the scope of the invention.

The ratio of hydrogen to carbon monoxide charged may vary widely within the scope of the invention. In general, a mole ratio of hydrogen to carbon monoxide of at least about 1 is employed. Suitable ratios of hydrogen to carbon monoxide comprise those within the range of from about 1 to about 10. Higher or lower ratios may, however, be employed within the scope of the invention. The ratio of hydrogen to carbon monoxide preferably employed will be governed to some extent by the nature of the reaction product desired. If conditions are selected that will result primarily in an aldehyde product, only one mole of hydrogen per mole of carbon monoxide enters into reaction with the olefin. When the alcohol is the desired product, two moles of hydrogen and one mole of carbon monoxide react with each mole of olefin. The minimum ratio of hydrogen to carbon monoxide employed will therefore generally be governed by the product desired. The use of ratios of hydrogen to carbon monoxide which are somewhat higher than those defined by these stoichiometrical values are generally preferred.

A signal advantage of the present invention as indicated above and further evidenced by the following examples is the ability to effect the direct, single stage hydroformylation of the olefins to a reaction mixture wherein the alcohols predominate over the aldehydes. The alcohols obtained from the starting olefins are furthermore generally primarily the straight chain or normal isomers. By selection of reaction conditions within the above-defined range, it is now possible to obtain 80% or more of the product in the form of the normal or straight chain compound rather than as its various branch-chain isomers.. Generally, the alcohol is the desired end product and the catalysts defined herein will produce this product under a relatively wide range of conditions. However, by varying the operating conditions within the range described herein, the ratio of aldehyde to alcohol product may be varied somewhat. Adjustment of these variables also permits some control over the particular isomer that will be produced.

A particularly valuable aspect of the invention resides in its ability to effect the direct, single stage hydroformylation of internal normal olefins, having for example, from 4 to 19 carbon atoms to the molecule to normal terminal alcohols having 5 to 20 carbon atoms to the molecule, respectively. Olefinic hydrocarbon fractions, such as, for example, polymeric olefinic fractions, cracked wax fractions, and the like, containing substantial proportions of internal olefins are readily hydroformylated to fractions of hydroformylated products comprising mixtures of terminal aldehydes and alcohols having one more carbon atom than the olefins in the charge and wherein these alcohols are the predominant reaction products. Such suitable feeds consisting of olefinic hydrocarbon fractions include, for example, $C_7$, $C_8$, $C_9$, $C_{10}$ and higher olefinic fractions as well as olefinic hydrocarbon fractions of wider boiling ranges such as $C_{7-9}$, $C_{10-13}$, $C_{14-17}$ olefinic hydrocarbon fractions and the like.

Under the above-defined conditions, the olefinic charge will react with carbon monoxide and hydrogen with the formation of reaction products comprising aldehydes and/or alcohols having one more carbon atom per molecule than the olefin charged.

The reaction mixtures obtained may be subjected to suitable catalyst and product separating means comprising one or more such steps, for example, as stratification, solvent extraction, distillation, fractionation, adsorption, etc. Catalyst, or components thereof, as well as unconverted charge, may be recycled in part or entirely to the reaction zone.

The process of this invention is generally applicable to the hydroformylation of any aliphatic or cycloaliphatic compound having at least one ethylenic carbon-to-carbon bond. Thus, it is applied to the hydroformylation of olefins having, for example, from 2 to 19 carbons to reaction mixtures predominating in aliphatic aldehydes and alkanols having one more carbon atom than the starting olefin. The invention is used to advantage in the hydroformylation of carbon-to-carbon ethylenically unsaturated linkages in hydrocarbons. Monoolefins such as ethylene, propylene, and butylene are a few examples of suitable hydrocarbons. Suitable hydrocarbons include both branched- and straight-chain compounds having one or more of these ethylenic or olefinic sites. These sites may be conjugated, as in 1,3-butadiene, or nonconjugated, as in 1,5-hexadiene. In the case of polyolefins, it is possible to hydroformylate only one of the olefinic sites or several or all of these sites. The unsaturated carbon-to-carbon olefinic linkages may be between terminal and their adjacent carbon atoms, as in 1-pentene, or between internal chain carbon atoms, as in 4-octene.

Hydroformylation of macromolecular materials involving acyclic units of the above types such as polydiolefins like polybutadiene, as well as copolymers of olefins and diolefins like the styrene-butadiene copolymer, is also comprised within the scope of the invention.

Hydrocarbon cyclic compounds are equally suitable for use in this invention. This group includes the unsaturated alicyclic hydrocarbons such as the cyclic olefins containing carbon-to-carbon unsaturation such as the cycloalkenes like cyclopentene, cyclohexene, and cycloheptene. Also included in this category are the terpenes and fused-ring polycyclic olefins, such as 2,5-bicyclo(2,2,1)-heptadiene, 1,4,4a,5,8,8a-hexahydro-1,4,5,8-dimethanonaphthalene and the like.

The process of this invention may also be used to hydroformylate ethylenic carbon-to-carbon linkages of nonhydrocarbons. Thus, it is possible to hydroformylate olefinically unsaturated alcohols, aldehydes, and acids to corresponding alcohols, aldehydes, and acids containing an aldehyde or hydroxy group on one of the carbon atoms previously involved in the olefinic bond of the starting material. The following are a few specific examples of different types of olefinic compounds that may be hydroformylated in accordance with the invention and the products obtained thereby:

$$CH_3(CH_2)_3CH=CH_2 + CO + H_2 \xrightarrow[\Delta]{catalyst} CH_3(CH_2)_5CHO$$
1-hexene → 1-heptanal and/or $CH_3(CH_2)_5CH_2OH$ + isomeric products
1-heptanol $$CH_2=CHCl + CO + H_2 \xrightarrow[\Delta]{catalyst} ClCH_2CH_2CH_2OH$$
3-chloropropanol and/or $ClCH_2CH_2CHO$ + isomeric products
3-chloropropanal $$CH_3COOCH_2CH=CH_2 + CO + H_2 \xrightarrow[\Delta]{catalyst}$$
allyl acetate $CH_3COOCH_2CH_2CH_2CHO$
γ-acetoxybutyraldehyde and/or $CH_3COOCH_2CH_2CH_2CH_2OH$ + isomeric products
Δ-acetoxybutanol cyclopentene + CO + H₂ →(catalyst, Δ) formylcyclopentane and/or cyclopentylcarbinol (−CH₂OH)

$$C_2H_5OCOCH=CHCOOC_2H_5 + CO + H_2 \xrightarrow[\Delta]{catalyst}$$
diethyl fumarate $C_2H_5OCOCHCH_2COOC_2H_5$ with CHO group
diethyl α-formylsuccinate and/or $C_2H_5OCOCHCH_2COOC_2H_5$ with CH₂OH group
diethyl α-methylolsuccinate allyl benzene (−CH₂CH=CH₂) + CO + H₂ →(catalyst, Δ) γ-phenylbutyraldehyde (−CH₂CH₂CHO)

and/or (−CH₂CH₂CH₂CH₂OH) + isomeric products
Δ-phenylbutanol

The olefinic charge to the process of the invention may comprise two or more of the above-defined suitable olefins. Olefinic hydrocarbon fractions are hydroformylated under the conditions above-defined to mixtures of aldehydes and alcohols in which the alcohols predominate.

The following examples are illustrative of the process of this invention. It is to be understood that these examples are given only for illustration and are not to be construed as limiting the invention in any way.

EXAMPLE I

Cobalt in complex combination with carbon monoxide and tri-n-butyphosphine was taken as a typical catalyst and 1-pentene as a typical olefin. The catalyst was prepared in situ, in the equipment to be described, from dicobalt octacarbonyl.

The tributyl phosphine was added in the various amounts indicated in Table 1, below, to illustrate the fact that the catalyst is equally effective when it has one or more carbon monoxide molecules serving as a ligand, provided that it has at least one tributyl phosphine molecule ligand.

The reactor used was a 100-ml. stainless-steel autoclave connected to a 0–1000 p.s.i.a. transducer and to a source of a premixed hydrogen-carbon monoxide gas. The volume of the external fittings was kept to a minimum to provide a maximum sensitivity of pressure to the charge in number of millimoles of hydrogen and carbon monoxide present. The above-indicated components forming the catalyst, (e.g., tri-n-butylphosphine and dicobalt octacarbonyl) and the olefin were charged to the reactor; a teflon magnetic stirring bar was added; the reactor was closed, evacuated, and pressured with $H_2$-CO gas until all foreign gases were displaced. The reactor was then heated under sufficient $H_2$+CO pressure so that the final pressure at reaction temperature was about 400 p.s.i.g. After the temperature was equilibrated, the pressure reduction was recorded. If a large amount of gas was absorbed, the reactor was repressured at suitable intervals. The results are tabulated in Table 1.

Table 1.—Hydroformylation of 1-pentene 1-pentene, millimoles: 64
Solvent-n-hexane, milliliters: 20
$H_2$/CO mole ratio: 1.9
Temperature: 195° C.
Catalyst: Cobalt complex with carbon monoxide and tri-n-butylphosphine
Catalyst starting materials used:
    $Co_2(CO)_8$
    Cobalt metal in catalyst, millimoles: 2
    Ligand added: Tri-n-butylphosphine

| Run No. | 1 | 2 | 3 | 4 |
|---|---|---|---|---|
| Tri-n-butylphosphine, millimoles | 35 | 4 | 2 | |
| Rate, millimoles/hour: | | | | |
|   Initial | >200 | >265 | >310 | |
|   Final | 0 | 0 | 0 | 0 |
| Length of experiment, hrs | 6 | 3.3 | 3.3 | 0.5 |
| Total gas consumed, millimoles | >134 | >146 | >143 | 13 |
| Product, millimoles: | | | | |
|   Pentenes | 0 | 0 | 0 | 23.4 |
|   n-Pentane | 11.6 | 15.6 | 16 | 1.5 |
|   $C_6$ aldehydes | 0.2 | 0.1 | 0.1 | 14.0 |
|   $C_6$ alcohols | 51.5 | 52.2 | 52.7 | 1.9 |
|   Recovered ligand | 17 | 0 | 0 | |
|   Unknown | Trace | | | Trace |
| Catalyst decomposition to cobalt metal | None | Slight | Slight | Complete |
| Conversion of pentenes | 100 | 100 | 100 | |
| Selectivity to $C^6$ Aldehydes and alcohols | 81.6 | 77 | 75 | |

It is seen from the foregoing results that whereas with $CO_2(CO)_8$ as catalyst (Run 4), the overall conversion was low, selectively to alcohol was extremely low, and the catalyst decomposed completely to cobalt metal, with the phosphine-containing catalyst (Runs 1, 2 and 3) the conversion of pentenes was 100%, the selectivity to oxo products was high, the selectivity to alcohols was high, and catalyst decomposition was never more than slight. These results demonstrate that replacement of part of the carbon monoxide in the cobalt carbonyl did not adversely affect carbonylating ability of the catalyst, but provided a cobalt-containing catalyst of increased stability and sustained carbonylating activity and markedly increased hydrogenating activity at the low carbon monoxide pressure utilized.

A complex between cobalt, triethoxyphosphine, and carbon monoxide was used to hydroformylate 1-pentene under otherwise substantially the same conditions. This resulted in a satisfactory yield of $C_6$ hydroformylation products.

EXAMPLE II

Using the same equipment, conditions, and catalyst as in Example I and Table I, Runs 1 and 2, the following results were obtained in the hydroformylation of 2-pentene:

|  | Percent |
|---|---|
| Conversion | 100 |
| Selectivity to $C_6$ aldehydes and alcohols | 74 |

Composition of alcohol product:

|  | Conditions of Table I | |
|---|---|---|
|  | Run 1 | Run 2 |
| 2-ethyl-1-butanol, percent | 2.7 | 1.6 |
| 2-methyl-1-pentanol, percent | 20.0 | 14.4 |
| n-Hexyl alcohol, percent | 77.3 | 84.0 |

These results show the marked selectivity for normal alcohol production versus branched-chain alcohols.

EXAMPLE III

Using the same equipment, conditions, and catalyst as in Example I and Table I, Run 1, the following results were obtained using 1-butene as the olefin charge to the hydroformylation:

|  | Percent |
|---|---|
| Conversion | 100 |
| Selectivity to $C_6$ aldehydes and alcohols | 80 |

Composition of alcohol product:
- 1-pentanol —— 77.7
- 2-methyl-1-butanol —— 22.3

EXAMPLE IV

Using the same equipment, conditions, and catalyst as in Example I and Table I, Run 1, the following results were obtained with propylene as the olefin hydroformylated:

|  | Percent |
|---|---|
| Conversion | 100 |
| Selectivity to $C_4$ aldehydes and alcohols | 84 |

Composition of alcohol product:
- n-Butyl alcohol —— 79.1
- Isobutyl alcohol —— 20.9

EXAMPLE V

This example illustrates another suitable method of preparing the catalyst used in Example I. The steps of Example I were repeated with the same reactant (1-pentene); the only difference being that 2 millimoles of cobalt acetate were added instead of cobalt octacarbonyl containing 2 millimoles of cobalt. 4 millimoles of tri-n-butylphosphine, as in Run 2 of Table 1, were also used.

The desired complex (i.e., of cobalt with carbon monoxide and tri-n-butylphosphine) formed from the acetate salt during addition of the $H_2$–CO gas, and the following results were recorded:

Product, millimoles:
- Pentenes —— 0
- n-Pentane —— 15
- $C_6$ aldehydes —— 0.2
- $C_6$ alcohols —— 47.5
- Unknown —— 3.0

Catalyst decomposition—slight, to cobalt metal
Conversion of pentenes—100%
Selectivity to $C_6$ aldehydes and alcohols—72%

EXAMPLE VI

The steps of Example I were repeated using 1-pentene as the olefin charge with the following changes:

CATALYST.—COBALT COMPLEX WITH CARBON MONOXIDE AND DIETHYLPHENYLPHOSPHINE

Catalyst starting materials:
- Diethylphenylphosphine—64 millimoles
- $Co_2(CO)_8$—2 millimoles Co metal Results:
- Conversion of the 1-pentene—100%
- Selectivity to $C_6$ aldehydes and alcohols—78.4%
- Composition of $C_6$ alcohol product:
  - 2-ethyl-1-butanol—2.3%
  - 2-methyl-1-pentanol—18.7%
  - n-Hexanol—79.0%

EXAMPLE VII

The steps of Example I were again repeated using 1-pentene as the olefin with the following changes:

CATALYST.—COBALT COMPLEX WITH CARBON MONOXIDE AND 1,2-BISDIPHENYLPHOSPHINOETHANE

Catatlyst starting materials:
- 1,2-bisdiphenylphosphinoethane—4 millimoles
- $Co_2(CO)_8$—2 millimoles Co metal Temperature—195° C.
Pressure—530 p.s.i.g. (maximum)

Results:
- Conversion of the 1-pentene—100%
- Selectivity to $C_6$ aldehydes and alcohols
- Composition of $C_6$ alcohol product:
  - 2-ethyl-1-butanol—4.3%
  - 2-methyl-1-pentanol—39.2%
  - n-Hexyl alcohol—56.5%

EXAMPLE VIII

In a 210 ml. magnetically stirred autoclave were placed 13.6 g. (0.04 m.) dicobalt octacarbonyl, 40 ml. (0.16 m.) tri-n-butylphosphine, and 100 ml. isopentane. Hydrogen and carbon monoxide were introduced and the autoclave heated to 150° C. (600 p.s.i.g.) for an hour. The resulting product mixture was filtered. Recrystallization of the solids, separated by filtration, from ethanol resulted in 2.38 g. of a yellow crystalline solid, M.P. 120–121° C. which upon analysis was shown to be a tri-n-butylphosphine cobalt carbonyl complex of the general structure $(n\text{-butyl}_3P)_2Co_2(CO)_7$. The filtrate was evaporated to dryness by passing nitrogen therethrough resulting in the obtaining of 12.1 g. a red crystalline tri-n-butylphosphine-cobalt-carbonyl complex, M.P. 103–104° C. which upon analysis was shown to be $[Co(CO)_{3n}\text{-}Bu_3P]_2$, a novel composition.

Results obtained in the hydroformylation of certain olefins with the red cobalt-tri-n-butylphosphine-carbonyl complex catalyst are indicated below:

| | |
|---|---|
| Catalyst —— m | 0.071 |
| Olefin charge —— m | 2.3 |
| Solvent | n-hexane |
| Total volume —— ml | 28 |
| Pressure (max.) —— p.s.i.g. | 450 |
| $H_2$/CO molar ratio | 1.9–2.1 |
| Temperature —— ° C. | 195 |

| Olefin | Conversion, percent | Selectivity to aldehydes and alcohols, percent | Composition of alcohol product | |
|---|---|---|---|---|
| | | | Least branched* alcohol, percent | Other isomer alcohols, percent |
| 1-pentene | 100 | 77 | 84.1 | 15.9 |
| 2-pentene | 100 | 74 | 83.9 | 16.1 |
| 1-butene | 100 | 80 | 77.7 | 22.3 |
| Propylene | 100 | 72 | 79.1 | 20.9 |
| Isobutylene | 100 | 56.6 | 95.7 | 4.3 |
| 4-me-2-pentene | 100 | 66.9 | 92.4 | 7.6 |
| 2-me-1-pentene | 87 | 60.5 | 88.7 | 11.3 |
| Cyclohexene | 100 | 75 | | |
| 2,3-dimethyl-2-butene | 77 | 53 | 84.8 | 15.2 |
| 3,3-dimethyl-1-butene | 100 | 79.8 | 98.4 | 1.6 |
| Diisobutylene | 100 | 22.8 | 100 | |

*Formed through the addition of CO to the terminal position of the olefin.

EXAMPLE IX

A tri-n-butylphosphine-cobalt-carbonyl catalyst was prepared by heating for a period of 4 hours at 170° C. a solution of 510 g. cobalt naphthenate in 140 cc. of tri-n-butylphosphine under a carbon monoxide and hydrogen pressure of 500 p.s.i.g. Thereafter the mixture was cooled and filtered, separating a yellow precipitate from a red filtrate. The filtrate was then cooled to 5° C. to crystallize out a red precipitate which was recovered by filtration. The red precipitate thus obtained upon analysis was shown to be a tri-n-butylphosphine-cobalt-carbonyl complex of the general formula:

$$[(Bu_3P)Co(CO)_3]_2$$

Hydroformylation of propylene in a single-stage operation at 500 p.s.i.g., 170° C., a ratio of $H_2/CO$ of 2/1 with the red tri-n-butylphosphine-cobalt-carbonyl catalyst resulted in a selectivity to aldehydes and alcohols of 92%, the composition of the alcohol products being 89% n-butanol and 11% isobutanol.

EXAMPLE X

A $C_{7-9}$ olefinic hydrocarbon fraction was hydroformylated by reaction with carbon monoxide and hydrogen in a $H_2/CO$ ratio of 2:1 (m), at 165–170° C., a pressure of 1000 p.s.i.g., with a contact time of 2.5 hours in the presence of a catalyst consisting of trioctylphosphine-cobalt-carbonyl. There was obtained a conversion of 90%, with a selectivity to $C_{8-10}$ alcohols of 75% and to $C_{8-10}$ aldehydes of 5%. Of the $C_{8-10}$ alcohols obtained, 80% are normal alcohols, the remainder iso alcohols.

EXAMPLE XI

A $C_7$ olefinic hydrocarbon fraction (consisting essentially of $C_3$–$C_4$ copolymers) was hydroformylated by reaction with carbon monoxide and hydrogen at 190° C., a $H_2/CO$ ratio (m.) of 1.5, a contact time of 2 hours, and a pressure of 1300 p.s.i.g., in the presence of a catalyst consisting of tri-n-butylphosphine-cobalt-carbonyl. There was obtained a conversion of 98.5% with a selectivity of 72.8% for isooctanols and 3.0% for isooctanals.

Hydroformylation of a $C_9$ olefinic fraction under substantially identical conditions resulted in a conversion of 83.8% with a selectivity for isodecanols of 76.4% and for isodecanals of 3.6%.

Similarly hydroformylated with good results were $C_{7-9}$; $C_{10-13}$; and $C_{14-17}$ olefinic hydrocarbon fractions.

We claim as our invention:

1. The process for the production of aldehydes and alcohols which comprises contacting an olefinic hydrocarbon with carbon monoxide and hydrogen at a temperature of from about 100° to about 300° C. in the presence of a complex catalyst consisting essentially of cobalt in complex combination with carbon monoxide and a trialkylphosphine, thereby reacting said olefinic compound with said carbon monoxide and hydrogen with the formation of aldehydes and alcohols having one more carbon atom than the olefinic compound.

2. The process for the production of aldehydes and alcohols which comprises contacting an olefinic hydrocarbon with carbon monoxide and hydrogen at a temperature of from about 100° to 300° C. and a pressure of from about 1 atmosphere to about 2000 p.s.i.g., in the presence of a complex catalyst consisting essentially of cobalt in complex combination with carbon monoxide and a trialkylphosphine, thereby reacting said olefinic hydrocarbon with the formation of aldehydes and alcohols having one more carbon atom than said olefinic hydrocarbon.

3. The process for the production of oxygenated hydrocarbons consisting essentially of aliphatic aldehydes and alcohols which comprises contacting an aliphatic olefinic hydrocarbon at a temperature of from about 100° to about 300° C. and a pressure of from about 1 atmosphere to about 1500 pounds with a catalyst consisting essentially of cobalt in complex combination with carbon monoxide and trialkylphosphine represented by the empirical formula:

$$(PR_3)_pCo(CO)_n$$

wherein R is alkyl and $p$ and $n$ are integers whose sum is 4 and each of which has a minimum value of 1, thereby reacting said aliphatic olefinic hydrocarbon with carbon monoxide and hydrogen with the formation of aliphatic aldehydes and alcohols having one more atom to the molecule than said aliphatic olefinic hydrocarbon.

4. The process for the production of aliphatic aldehydes and alcohols having from 3 to 20 carbon atoms to the molecule which comprises reacting an aliphatic monoolefinic hydrocarbon having from 2 to 19 carbon atoms to the molecule at a temperature of from about 10° to about 300° C., and a pressure of from about 1 atmosphere to about 1500 p.s.i.g. in the presence of a complex catalyst represented by the empirical formula:

$$(PR_3)_pCo(CO)_n$$

wherein each R is an alkyl group of from 1 to 20 carbons and $p$ and $n$ are integers whose sum is 4 and which each has a minimum value of 1.

5. The process in accordance with claim 4 wherein said R is n-butyl.

6. The process for the production of reaction products consisting essentially of butyraldehyde and butanol which comprises reacting propylene with carbon monoxide and hydrogen at a temperature of from about 100 to about 300° C. and a pressure of from about 1 atmosphere to about 1500 pounds in the presence of a complex catalyst represented by the empirical formula:

$$(PR_3)_pCo(CO)_n$$

wherein R represents alkyl of 1 to 20 carbons and $p$ and $n$ are integers whose sum is four and each has a minimum value of 1.

7. The process for the production of reaction products consisting essentially of aldehydes and alcohols having six carbons to the molecule which comprises reacting a pentene with carbon monoxide and hydrogen at a temperature of from about 100 to about 300° C. and a pressure of from about 1 atmosphere to about 1500 pounds in the presence of a complex catalyst represented by the empirical formula:

$$(PR_3)_pCo(CO)_n$$

wherein R represents alkyl of 1 to 20 carbons and $p$ and $n$ are integers whose sum is four and each has a minimum value of 1.

$$(PR_3)_pCo(CO)_n$$

8. The process for the direct single-stage conversion of an olefinic hydrocarbon having from 2 to 19 carbon atoms to the corresponding aldehydes and alcohols having one more carbon atom to the molecule than said olefinic hydrocarbon which comprises reacting said olefinic hydrocarbon with carbon monoxide and hydrogen at a temperature of from about 100 to about 300° C. and a pressure of from about 1 atmosphere to about 800 pounds in the presence of a complex catalyst of the empirical formula:

$$(PR_3)_pCo(CO)_n$$

wherein R represents an alkyl group of 1 to 20 carbons and $p$ and $n$ are integers whose sum is four and each of which has a minimum value of 1.

9. The process in accordance with claim 8 wherein said R is n-butyl.

10. The process for the production of n-butanol which comprises reacting normal propylene with carbon monoxide and hydrogen at a temperature of from about 100° to about 300° C. and a pressure of from about 400 to about 800 pounds in the presence of a complex catalyst of the empirical formula:

$$(tri\text{-}n\text{-}butylphosphine)_pCo(CO)_n$$

wherein *p* and *n* are integers each having a minimum value of one and whose sum is four.

11. The process for the production of n-hexanol which comprises reacting a normal pentene with carbon monoxide and hydrogen at a temperature of from about 100° to about 300° C. and a pressure of from about 400 to about 800 pounds in the presence of a complex catalyst of the empirical formula:

$$(\text{tri-n-butylphosphine})_p\text{Co(CO)}_n$$

wherein *p* and *n* are integers each having a minimum value of one and whose sum is four.

12. The process for the production of n-butanol which comprises reacting propylene with carbon monoxide and hydrogen at a temperature of from about 150° to about 210° C. and a pressure of from about 400 to about 800 pounds in the presence of a tributylphosphine-cobalt-carbonyl complex catalyst represented by the formula:

$$[(\text{tributylphosphine})\text{Co(CO)}_3]_2$$

13. The process for the direct, single-stage production of a straight chain terminal alkanol having from 5 to 20 carbon atoms to the molecule which comprises contacting a straight chain internal olefin having from 4 to 19 carbon atoms to the molecule with carbon monoxide and hydrogen at a temperature of from about 100 to about 300° C. and a pressure of from about 400 to about 800 pounds with a complex catalyst represented by the empirical formula:

$$(\text{PR}_3)_p\text{Co(CO)}_n$$

wherein R represents an alkyl group of 1 to 20 carbons and *p* and *n* are integers whose sum is 4 and each has a minimum value of 1, thereby reacting said internal mono-olefin with said carbon monoxide and hydrogen with the formation of reaction products predominating in a straight chain terminal alkanol having one more carbon atom to the molecule than said mono-olefin.

14. The process for the direct single-stage production of n-hexanol which comprises reacting 2-pentene with carbon monoxide and hydrogen at a temperature of from about 100 to about 300° C. and a pressure of from about 400 to about 800 pounds in the presence of a tributylphosphine-cobalt-carbonyl complex catalyst represented by the formula:

$$[(\text{tributylphosphine})\text{Co(CO)}_3]_2$$

References Cited by the Examiner

UNITED STATES PATENTS 3,102,899   9/1963   Cannell _____ 260—439
3,150,188   9/1964   Eisenmann et al. _____ 260—604

LEON ZITVER, *Primary Examiner.*